United States Patent
Kim

(10) Patent No.: US 10,137,891 B2
(45) Date of Patent: Nov. 27, 2018

(54) DRIVING ASSISTANCE APPARATUS AND DRIVING ASSISTANCE METHOD

(71) Applicant: MANDO CORPORATION, Pyeongtaek-si, Gyeonggi-do (KR)

(72) Inventor: Hyeong Ki Kim, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 161 days.

(21) Appl. No.: 15/247,915

(22) Filed: Aug. 26, 2016

(65) Prior Publication Data
US 2017/0057499 A1   Mar. 2, 2017

(30) Foreign Application Priority Data

Sep. 1, 2015 (KR) .......................... 10-2015-0123789

(51) Int. Cl.
*B60W 30/09* (2012.01)
*G05D 1/02* (2006.01)
(Continued)

(52) U.S. Cl.
CPC ............. *B60W 30/09* (2013.01); *B60Q 9/008* (2013.01); *B60W 10/18* (2013.01); *B60W 10/20* (2013.01); *B60W 30/0953* (2013.01); *B60W 30/0956* (2013.01); *B62D 15/0265* (2013.01); *G05D 1/0246* (2013.01); *G05D 1/0255* (2013.01); *G05D 1/0257* (2013.01); *G08G 1/166* (2013.01); *B60W 2420/42* (2013.01); *B60W 2420/52* (2013.01); *B60W 2420/54* (2013.01); *B60W 2520/10* (2013.01); *B60W 2550/10* (2013.01); *B60W 2550/22* (2013.01); *B60W 2550/302* (2013.01); *B60W 2550/308* (2013.01); *B60W 2600/00* (2013.01); *B60W 2710/18* (2013.01); *B60W 2710/20* (2013.01); *B60W 2900/00* (2013.01)

(58) Field of Classification Search
CPC . B60Q 9/008; B60W 2550/308; B60W 30/09; B60W 30/095; B60W 30/0956; B60W 2420/54; G01S 13/93; G01S 13/931; G01S 17/93; G01S 17/936; G01S 15/93; G01S 15/931; G01B 11/026; G01B 11/27; G01B 11/24; G01B 11/02; G01B 11/04; G05D 1/0257; G05D 1/0255; G08G 1/166

See application file for complete search history.

(56) References Cited

U.S. PATENT DOCUMENTS

| 2007/0035385 | A1* | 2/2007 | Miyahara ................ G01S 11/12 340/435 |
| 2007/0127779 | A1* | 6/2007 | Miyahara ................ G01C 3/08 382/106 |
| 2010/0085238 | A1* | 4/2010 | Muller-Frahm ........ G01S 11/12 342/70 |

* cited by examiner

Primary Examiner — Dale Moyer
(74) Attorney, Agent, or Firm — Hauptman Ham, LLP

(57) ABSTRACT

Disclosed is a driving assistance apparatus that includes at least: a first sensing unit that senses a width of a forward object, a distance to the forward object, a speed of the forward object, and a speed of an own vehicle; a first determining unit that determines a risk of collision with the forward object; a second sensing unit that senses a distance to a first corner of the forward object, and a distance to a second corner of the forward object; a calculating unit that calculates a distorted angle of the forward object based on the width of the forward object, the distances; a second determining unit that determines the risk of collision based on a smaller one of the sensed distances; and a control unit that controls the notification device, the braking device, and the steering device.

15 Claims, 8 Drawing Sheets

(51) Int. Cl.
*B60Q 9/00* (2006.01)
*B60W 10/18* (2012.01)
*B60W 10/20* (2006.01)
*B60W 30/095* (2012.01)
*B62D 15/02* (2006.01)
*G08G 1/16* (2006.01)

DRIVING ASSISTANCE APPARATUS AND DRIVING ASSISTANCE METHOD

CROSS REFERENCE TO RELATED APPLICATION

This application claims priority from Korean Patent Application No. 10-2015-0123789, filed on Sep. 1, 2015, which is hereby incorporated by reference for all purposes as if fully set forth herein.

BACKGROUND OF THE INVENTION

1. Field of the Invention

Embodiments disclosed herein relate to a driving assistance technique.

2. Description of the Prior Art

As to vehicles as transport means, various research has recently been performed not only for the improvement of gasoline mileage and performance of a vehicle, but also for control devices that are capable of preventing or avoiding a risk caused in driving a vehicle by the carelessness of a driver.

Typically, a Smart Cruise Control (SCC) device, a Highway Driving Assist (HDA) device, and a Traffic Jam Assist device may be exemplified.

Such control devices sense a distance between the own vehicle and a forward vehicle that travels in front of the own vehicle in the same lane, and control an acceleration device or a braking device of the own vehicle so as to maintain a predetermined distance between the own vehicle and the forward vehicle.

That is, the above-mentioned control devices may operate normally or abnormally depending on whether the distance to a forward vehicle is correctly sensed.

In general, a radar and a camera, which are capable of remote sensing, are used as sensing means installed in the own vehicle so as to sense a forward vehicle.

However, the radar has a limitation in that it cannot correctly sense a collision point with respect to a forward vehicle that is obliquely positioned with reference to the own vehicle. Similarly, the camera has a limitation in that it cannot recognize, within a short distance, a forward vehicle that is obliquely positioned with reference to the own vehicle.

The above-mentioned control devices may operate abnormally as the distance to the forward vehicle may not be correctly sensed due to the above-described limitation.

On the contrary, when an ultrasonic sensor is used, there is an advantage in that a forward vehicle, which is obliquely positioned with reference to the own vehicle, can be correctly recognized. However, the ultrasonic sensor has a disadvantage in that its sensing distance is short.

SUMMARY OF THE INVENTION

In this background, the object of the embodiments is to provide a technique that more precisely senses a forward vehicle, which is obliquely positioned with respect to the own vehicle, so as to normally control the own vehicle.

In one aspect, the embodiment provides a driving assistance apparatus that includes: a first sensing unit configured to sense at least one of a width of a forward object, a distance to the forward object, a speed of the forward object, and a speed of an own vehicle; a first determining unit configured to determine a risk of collision with the forward object based on the distance to the forward object, the speed of the forward object, and the speed of the own vehicle; a second sensing unit configured to, when the first determining unit determines that there is a risk of collision, sense a first distance, which is a distance to a first corner of the forward object and a second distance, which is a distance to a second corner of the forward object; a calculating unit configured to calculate a distorted angle of the forward object based on the width of the forward object, the first distance, and the second distance; a second determining unit configured to, when the calculated distorted angle is equal to or larger than a preset critical angle, further determine the risk of collision based on a smaller one of the sensed first and second distances, the speed of the forward object, and the speed of the own vehicle; and a control unit configured to, when the second determining unit determines that there is the risk of collision, control at least one of the notification device, the braking device, and the steering device.

In another aspect, the embodiment provides a driving assistance method that includes: a first sensing step of sensing at least one of a width of a forward object, a distance to the forward object, a speed of the forward object, and a speed of an own vehicle; a first determining step of determining a risk of collision with the forward object based on the distance to the forward object, the speed of the forward object, and the speed of the own vehicle; a second sensing step of, when the first determining unit determines that there is a risk of collision, sensing a first distance, which is a distance to a first corner of the forward object, and a second distance, which is a distance to a second corner using an ultrasonic sensor; a calculating step of calculating a distorted angle of the forward object based on the first distance and the second distance; a second determining step of, when the calculated distorted angle is equal to or larger than a preset critical angle, further determining the risk of collision based on a smaller one of the sensed first and second distances, the speed of the forward object, and the speed of the own vehicle; and a control step of, when the second determining unit determines that there is the risk of collision, controlling at least one of the notification device, the braking device, and the steering device.

As described above, according to the embodiments, a forward vehicle, which is obliquely positioned with respect to the own vehicle, can be sensed more precisely, and thus, the own vehicles can be correctly controlled.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1A:
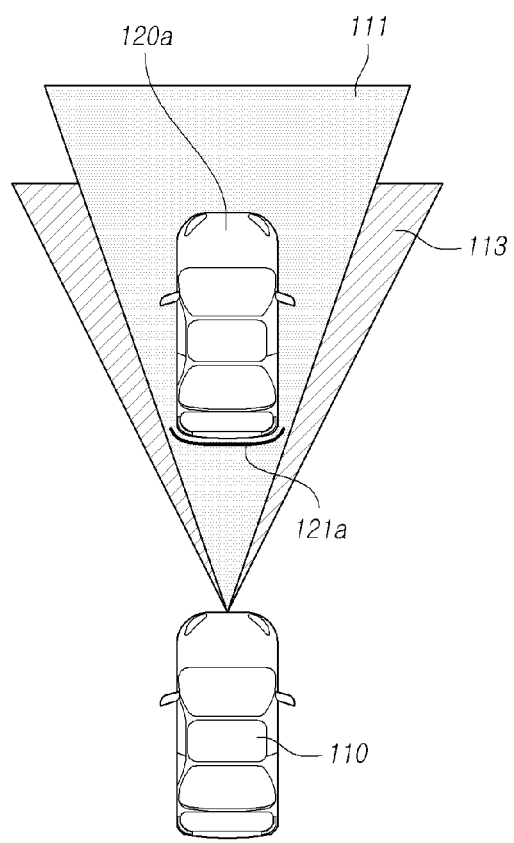
FIG. 1A is a view illustrating an example for describing an operation of an ordinary driving assistance apparatus.

Hereinafter, some embodiments of the present invention will be described in detail with reference to the accompanying illustrative drawings. In designating elements of the drawings by reference numerals, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may be connected to", "be coupled to", or "be in contact with" the structural elements as well as that the certain structural element is directly connected to or is in direct contact with another structural element.

Figure 1B:
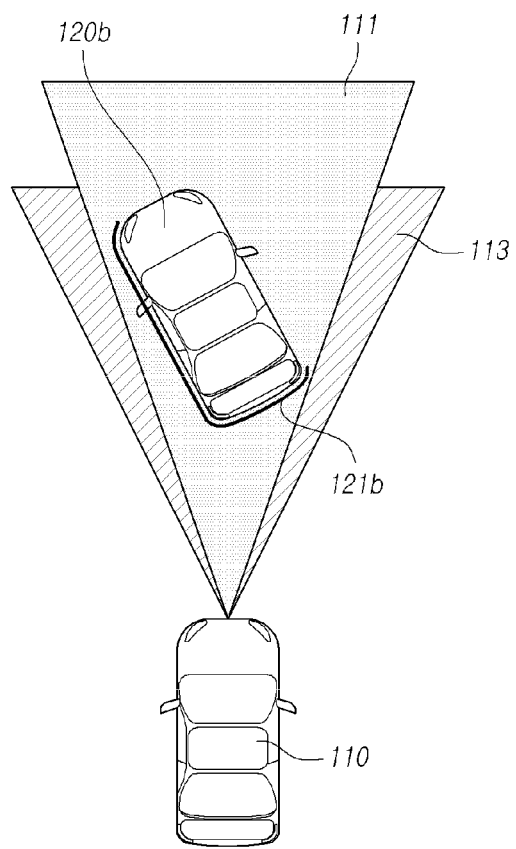
FIG. 1B is a view illustrating an example for describing an operation of an ordinary driving assistance apparatus.

FIG. 1A is a view illustrating an example for describing an operation of an ordinary driving assistance apparatus, and FIG. 1B is a view illustrating an example for describing an operation of an ordinary driving assistance apparatus.

Referring to FIGS. 1A and 1B, an ordinary driving assistance apparatus senses a forward object 120 positioned in front of the own vehicle 110 using a sensor, determines a risk of collision based on the distance between the own vehicle and the forward object 120, a time to collision with the forward object 120, and operates at least one of a notification device, a braking device, and a steering device, which are included in the own vehicle 110 based on the results of determination, thereby preventing a collision accident.

In general, as the sensor, a radar having a radar sensing region 111 and a camera having a camera sensing region 113 are used. The distance of the radar sensing region 111 and the distance of the camera sensing region 113 may be about 50 m or more.

The radar and the camera may correctly recognize a forward vehicle 120a having a uniform sensing face 121a as illustrated in FIG. 1A. However, the radar and the camera may not correctly recognize a forward vehicle 120b having a non-uniform sensing face 121b. Whether a sensing face is uniform or not is determined based on a distance. Distances between respective points on the uniform sensing face 121a and the own vehicle 110 are similar to each other. Whereas, distances between respective points on the non-uniform sensing face 121b and the own vehicle 110 are not similar to each other.

Thus, the radar, which senses the forward vehicle 120b having the non-uniform sensing face 121b as illustrated in FIG. 1b, may have a limitation in detecting a collision point, and the camera, which senses the forward vehicle 120b, may have a limitation in that it cannot recognize the forward vehicle 120b at a predetermined distance.

According to such limitation, an ordinary driving assistance apparatus has a problem in that it cannot correctly recognize a longitudinal distance between the own vehicle 110 and the forward vehicle 120b when the forward vehicle 120b has a distorted angle with reference to the own vehicle as in FIG. 1B. Such a problem may be solved by using an ultrasonic sensor. However, the ultrasonic sensor has a short ultrasonic sensing region, and thus, when only the ultrasonic sensor is used, the ultrasonic sensor cannot sense a forward vehicle 120a, which is directed similar to the own vehicle 110 and is positioned outside the ultrasonic sensing region.

Hereinafter, a driving assistance apparatus of the present embodiment will be described in detail, which may sense a forward vehicle 120a directed similar to the own vehicle 110 using a camera having a long sensing region distance and a radar, and may determine a risk of collision with a forward vehicle 120b having a distorted angle with reference to the own vehicle 110 using an ultrasonic sensor that has a short sensing region distance but may correctly sense the forward vehicle 120b, thereby preventing a collision.

Figure 2:
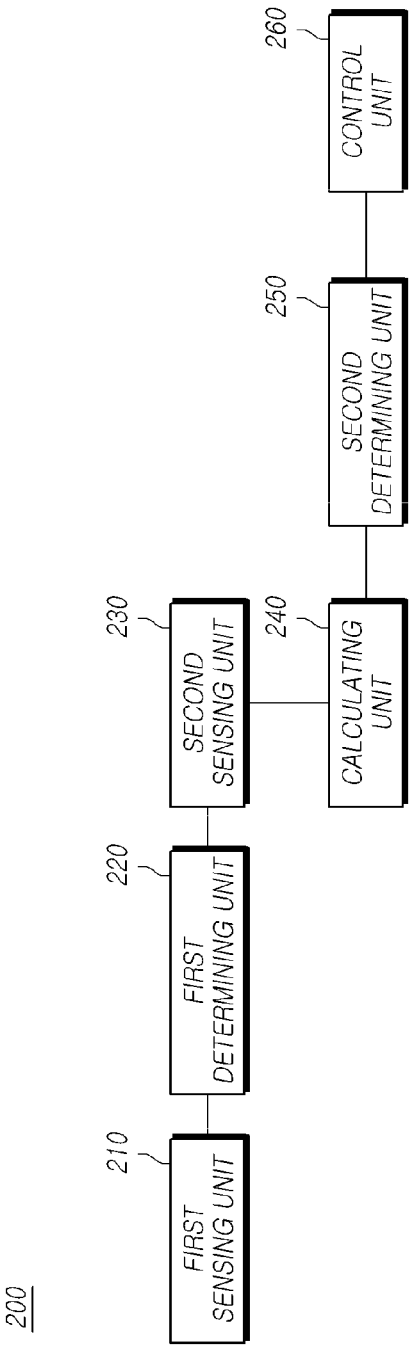
FIG. 2 is a view illustrating a configuration of a driving assistance apparatus according to one embodiment.

FIG. 2 is a view illustrating a configuration of a driving assistance apparatus according to one embodiment.

Referring to FIG. 2, a driving assistance apparatus 200 according to one embodiment may include: a first sensing unit 210 configured to sense at least one of the width of a forward object, the distance to the forward object, the speed of the forward object, and the speed of the own vehicle; a first determining unit 220 configured to determine a risk of collision with the forward object based on the distance to the forward object, the speed of the forward object, and the speed of the own vehicle; a second sensing unit 230 configured to, when the first determining unit 220 determines that there is a risk of collision, sense a first distance, which is a distance to a first corner of the forward object, and a second distance, which is a distance to a second corner of the forward object; a calculating unit 240 configured to calculate a distorted angle of the forward object based on the width of the forward object, the first distance, and the second distance; a second determining unit 250 configured to, when the calculated distorted angle is equal to or larger than a preset critical angle, further determine the risk of collision based on a smaller one of the sensed first and second distances, the speed of the forward object, and the speed of the own vehicle; and a control unit 260 configured to, when the second determining unit 250 determines that there is the risk of collision, control at least one of the notification device, the braking device, and the steering device.

The first sensing unit 210 may sense the width of the forward object, the distance to the forward object, and the speed of the forward object using at least one of the radar and the camera, and may sense the speed of the own vehicle using a vehicle speed sensor. Without being limited thereto, however, the first sensing unit 210 may sense the width of the forward object, the distance to the forward object, the speed of the forward object, and the speed of the own vehicle using another sensor.

The radar is a device that projects an electromagnetic wave and analyzes the electromagnetic wave when the electromagnetic wave is hit to, and reflected from, an object so as to sense the object. When the projected electromagnetic wave is a low frequency wave having a long wavelength, the electromagnetic wave is slightly attenuated, and thus, it is possible to detect a distant place, but the resolution may become worse since a precise measurement is impossible. On the contrary, when the projected electromagnetic wave is a high frequency wave, the high frequency wave may be easily absorbed into, or reflected from, water vapor contained in the air, snow, or rain to be greatly attenuated, and thus, it is impossible to detect a distance place, but a high resolution may be obtained.

Whereas, the camera may include a light collecting unit configured to receive light, an imaging unit configured to form an image using the received light, and an adjusting device configured to adjust various states. The light collecting unit receives light so as to cause an image to be formed on the imaging unit. The imaging unit stores an image by using the image formed by the light collecting unit. A film camera uses a photosensitive film as the imaging unit, and a digital camera uses a Complementary Metal Oxide Semiconductor (CMOS) or a Charge Coupled Device (CCD), which converts a light signal into an electric signal, as the imaging unit. The adjusting device may include an iris configured to adjust a size of an aperture, a shutter configured to receive or block light, a flash for use in photographing in a dark place, a viewfinder configured to look in advance an object to be photographed, a panorama function for continuous photographing, and so on.

The vehicle speed sensor may include a mechanical vehicle speed sensor configured to transmit the rotation of a transmission output shaft to a driving shaft of a speedometer via a flexible shaft, thereby moving an indicator, and an electronic vehicle speed sensor configured to detect the rotation of the transmission output shaft using an electronic pickup, a hall device, a reed switch, a magneto resistive element, and so on.

The first determining unit 220 calculates a relative speed based on the speed of the forward object, which is sensed by the first sensing unit 210, and calculates a Time To Collision (TTC) based on the calculated speed of the own vehicle and the distance to the forward object, which is sensed by the first sensing unit 210, and when the calculated TTC is equal to or less than a preset first critical TTC, the first determining unit 220 may determine that there is a risk of colliding with the forward object.

The relative speed may be calculated by subtracting the speed of the own vehicle from the speed of the forward object, and the TTC may be calculated by dividing the distance to the forward object by the relative speed.

The first critical TTC is a time that is set based on test data, and an error that may occur when the radar and the camera sense a forward vehicle having a distorted angle may be considered in the first critical TTC.

The second sensing unit 230 may sense a first distance, which is a distance to a first corner of the forward object, and a second distance, which is a distance to a second corner of the forward object, using an ultrasonic sensor.

The ultrasonic sensor refers to a sensor that uses a characteristic of an ultrasonic wave, which is a sound having a high frequency (about 20 kHz or more) that is inaudible to the human ear. The ultrasonic distance may be used for air, liquid and solid mediums, and may measure speed, distance, concentration, viscosity, and so on. The ultrasonic sensor has a disadvantage in that the length of its sensing region is short as compared with a radar or a camera.

That is, the second sensing unit 230 may sense a first distance, which is a distance to a first corner of the forward object, and a second distance, which is a distance to a second corner, using one or more ultrasonic sensors.

For example, a point at which a distance sensed using the ultrasonic sensor decreases and then increases with respect to one direction and a point at which the distance linearly increases and then nonlinearly increases with respect to another direction, or a point at which the distance linearly increases and then nonlinearly increases with respect to the one direction and a point at which the distance decreases and then increases with respect to the another direction are determined as a first corner and a second corner, respectively, and the distances to the first corners and the second corners may be sensed as a first distance and a second distance, respectively.

This may result from the fact that, when a tetrahedron including a vehicle in a distorted state is sensed by the ultrasonic sensor, two planes are observed from one of two corners (corners, each of which is formed by two planes) at the ultrasonic sensor side, but only one plane is observed from the other corner.

The calculating unit 240 may calculate the distorted angle of the forward object based on the first and second distances sensed by the second sensing unit 230.

For example, the distorted angle may be calculated based on the width of the forward object, which is sensed by the first sensing unit 210 and a difference between the first and second distances sensed by the second sensing unit 230, and using a trigonometric function. The virtual width of the forward object and the difference between the first and second distances in a case where the distorted state is not considered may have a tangent relationship with respect to the distorted angle, and the real width of the forward object and the difference between the first and second distances in a case where the distorted state is considered may have a sine relationship with respect to the distorted angle. By using these relationships, the calculating unit 240 may calculate the distorted angle of the forward object.

When the distorted angle calculated by the calculating unit 240 is equal to or larger than the preset critical angle, the second determining unit 250 may further determine the risk of collision based on the small distance of the first and second distances sensed by the second sensing unit 230 and the speeds of the forward object and the own vehicle sensed by the first sensing unit 210.

For example, the second determining unit 250 calculates the relative speed by subtracting the speed of the own vehicle from the speed of the forward object, and calculates a TTC by dividing the smaller one of the first and second distances by the relative speed. When the TTC is equal to or smaller than the preset first critical TTC, the second determining unit 250 may determine that there is a risk of collision.

When the forward object has a distorted angle that is equal to or larger than the critical angle, the first sensing unit 210 may sense an erroneous longitudinal length to the forward object. Accordingly, by using the distance sensed by the second sensing unit 230, the second determining unit 250 may correctly determine the risk of collision.

According to the risk of collision determined by the second determining unit 250, the control unit 260 may control at least one of the notification device, the braking device, and the steering device included in the own vehicle, thereby preventing the collision with the forward object.

Meanwhile, the second determining unit 250 may further determine a direction corresponding to the smaller one of the first and second distances sensed by the second sensing unit 230, as the moving direction of the forward object. For example, when the first distance, which is the distance to the left corner of the forward object, is smaller than the second distance, which is the distance to the right corner, the second determining unit 250 may determine that the moving direction of the forward object is leftward.

Thus, the control unit 260 may control at least one of the braking device and the steering device of the own vehicle such that the own vehicle moves in the direction opposite to the determined moving direction of the forward object. For example, when it is determined that the moving direction of the forward object is leftward, the control unit 260 may perform a control such that only the braking device installed in a right tire of the own vehicle is operated so as to cause the own vehicle to move rightward. Alternatively, the control unit 260 may control the steering device of the own vehicle such that the own vehicle moves rightward.

Meanwhile, the calculating unit 240 may further calculate an angular acceleration in order to avoid the collision with the forward object based on the calculated distorted angle. The angular acceleration may be inversely proportional to the distorted angle.

Thus, the control unit 260 may calculate a side force of the front tires and a side force of the rear tires based on the calculated angular acceleration, the inertia moment of the own vehicle, the distance from the center of gravity of the own vehicle to the front tires, and the distance from the center of gravity to the rear tires, and may control the braking devices installed in the front tires or the braking devices installed in the rear tires depending on each of the side force of the front tires and the side force of the rear tires.

Meanwhile, the first sensing unit 210 may further sense whether a crossroad exists ahead. For example, when the number of sensed traffic lights or pedestrian crossings is equal to or larger than a preset critical number, the first sensing unit 210 may sense that a crossroad exists ahead.

When it is sensed that a crossroad exists, the second determining unit 250 may determine the risk of collision based on the determination as to whether the distorted angle is equal to or larger than the critical angle, the smaller one of the first and second distances, the speed of the forward object, and the speed of the own vehicle.

Figure 3:
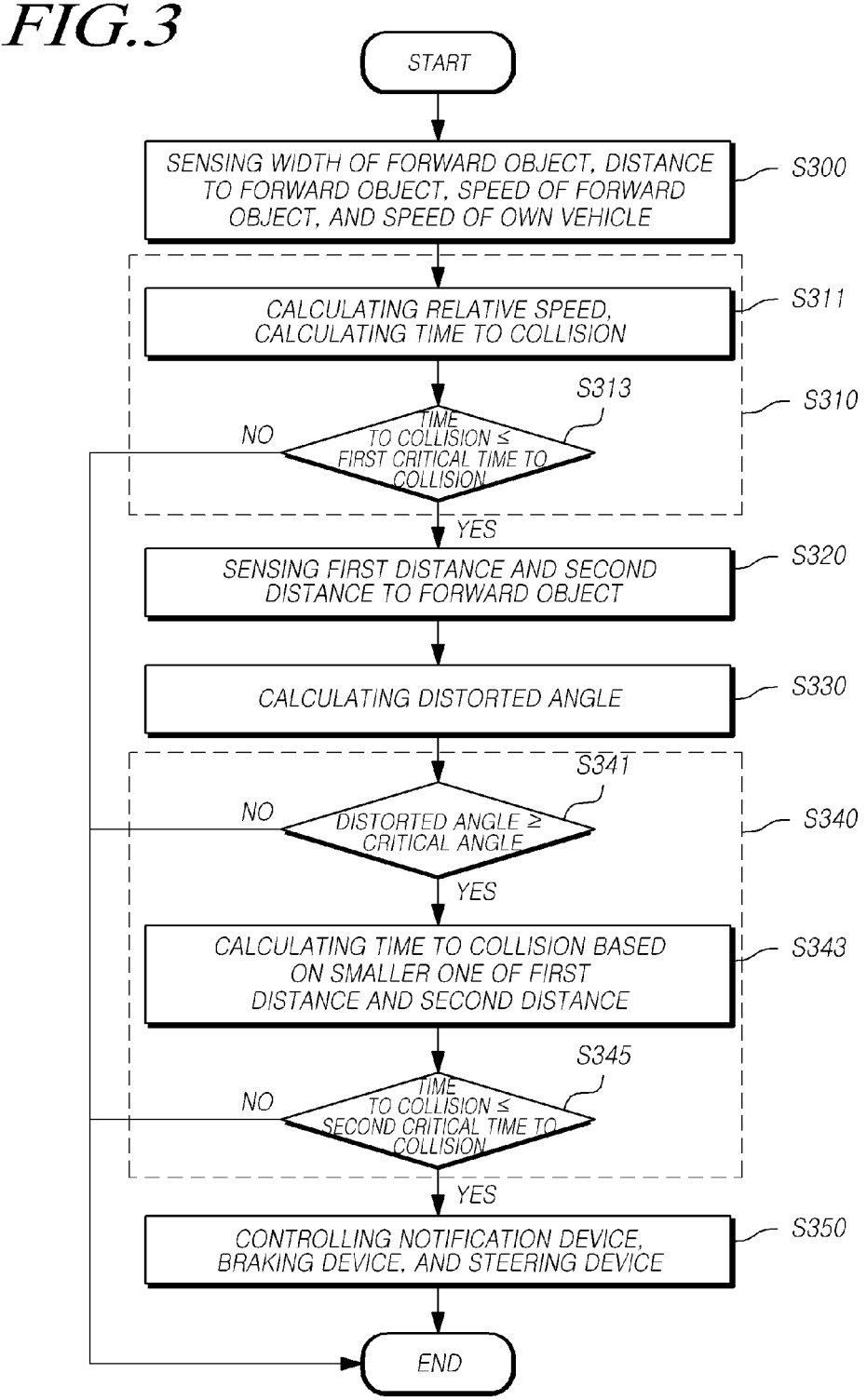
FIG. 3 is a view illustrating an example for describing an operation of a driving assistant apparatus according to one embodiment.

FIG. 3 is a view illustrating an example for describing an operation of a driving assistant apparatus according to one embodiment.

Referring to FIG. 3, the first sensing unit according to one embodiment may sense the width of the forward object, the distance to the forward object, the speed of the forward object, and the speed of the forward object (S300).

For example, the first sensing unit may sense the width of the forward object, the distance to the forward object, and the speed of the forward object using at least one of the radar and the camera, and may sense the speed of the own vehicle using a speed sensor.

For example, the first sensing unit, which senses a forward object, which is a forward object, may sense the width of the front object by sensing the distance between the opposite taillights of the forward vehicle. Without being limited thereto, however, the first sensing unit may sense the width of the forward object by sensing a shape, a color, or the like, which may serve as a standard for sensing the width.

Thereafter, the first determining unit may calculate a relative speed based on the speeds of the forward object and the own vehicle sensed in step S300 and using Equation 1 as follows, and may calculate a Time To Collision (TTC) based on the distance to the forward object sensed in step S300 and the calculated relative speed and using Equations as follows (S311).

Relative Speed [m/s]=Speed of Forward Object [m/s]−Speed of Own Vehicle [m/s]   Equation 1

TTC [s]=Distance to Forward Object [m]/Relative Speed [m/s]   Equation 2

In addition, the first determining unit determines whether the TTC calculated in step S311 is equal to or smaller than a preset first critical TTC (S313).

The first determining unit may determine the risk of collision with a sensed forward object by performing step S311 and step 310 including step S311. When the risk of collision exists, it may mean a situation in which the calculated TTC is equal to or less than the first critical TTC.

When it is determined that the TTC is equal to or less than the first critical TTC in step S313 (YES), the second sensing unit senses a first distance, which is a distance to the first corner of the forward object, and a second distance, which is a distance to the second corner of the same forward object (S320).

For example, the second sensing unit may determine a point where a distance sensed using an ultrasonic sensor decreases and then increases with respect to one direction and a point at which the distance linearly increases and then nonlinearly increases with respect to another direction, or a point at which the distance linearly increases and nonlinearly decreases with respect to the one direction and a point at which the distance decreases and then increases with respect to the another direction are determined as a first corner and a second corner, respectively, and the distances to the first corners and the second corners may be sensed as the first distance and the second distance, respectively.

This may result from the fact that, when a tetrahedron including a vehicle in a distorted state is sensed by the ultrasonic sensor, two planes are observed from one of two corners (each of which is formed by two planes) at the ultrasonic sensor side, but only one plane is observed from the other corner.

When step S320 is conducted, the calculating unit may calculate the distorted angle of the forward object based on the width of the forward object sensed in step S300 and the first and second distances sensed in step S320, and using Equation 3 or Equation 4 as follows (S330).

Distorted Angle of Forward Object [degree]=tan$^{-1}$ ((First Distance [m]−Second Distance [m])/Virtual Width [m])   Equation 3

The virtual width refers to a width in which the distorted state is not considered (i.e. the width of the face of the forward object), which faces the first sensing unit.

Distorted Angle of Forward Object [degree]=sin$^{-1}$ ((First Distance [m]−Second Distance [m])/Real Width [m])   Equation 4

The real width refers to a width in a case where the distorted state is considered (i.e. the width of the real forward object).

Step S330 will be described in detail with reference to FIGS. 4 to 5B.

Figure 4:
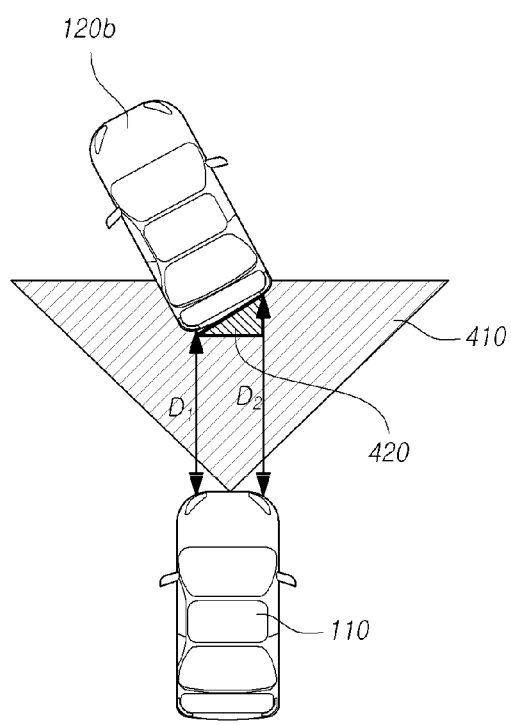
FIG. 4 is a view illustrating an example for describing an operation of a calculating unit according to one embodiment.
Figure 5A:
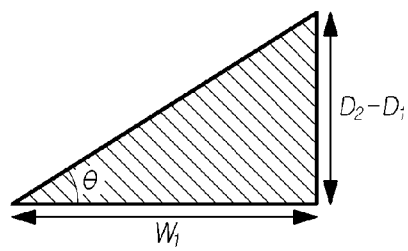
FIG. 5A is a view illustrating another example for describing an operation of a calculating unit according to one embodiment.
Figure 5B:
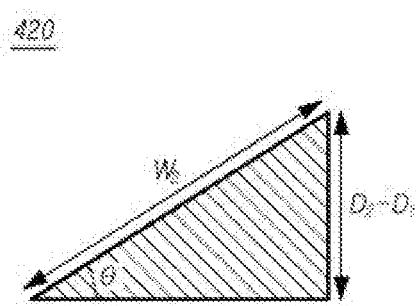
FIG. 5B is a view illustrating still another example for describing an operation of a calculating unit according to one embodiment.

FIG. 4 is a view illustrating an example for describing an operation of a calculating unit according to one embodiment, FIG. 5A is a view illustrating another example for describing an operation of a calculating unit according to one embodiment, and FIG. 5B is a view illustrating still another example for describing an operation of a calculating unit according to one embodiment.

Referring to FIG. 4, the second sensing unit may sense a first distance $D_1$, which is a distance to a first corner of a forward object 120*b* having a distorted angle, and a second distance $D_2$, which is a distance to a second corner of the forward object 120*b*, using an ultrasonic sensor having an ultrasonic sensing region 410. In this state, the width of the forward object 120b and a difference between the second distance $D_2$ and the first distance $D_1$ may correspond to one side and another side of a right-angled triangle 420 including the distorted angle θ, respectively.

Referring to FIG. 5A, the virtual width $W_1$ of the forward object 120b and a difference between the second distance $D_2$ and the first distance $D_1$, $D_2$-$D_1$, may correspond to the bottom side and the height side of the right-angled triangle 420 including the distorted angle θ, respectively. Thus, the value obtained by dividing the difference between the second distance $D_2$ and the first distance $D_1$, $D_2$-$D_1$, by the virtual width $W_1$ may be expressed with the tangent for the distorted angle θ, and the above-mentioned Equation 3 may be obtained by using the inverse tangent for such a relationship. Assuming that a camera is used in the first sensing unit, the virtual width is a width of the forward object in an image captured by the camera, and may be equal to or smaller than the real width.

Referring to FIG. 5B, the real width $W_2$ of the forward object 120b and a difference between the second distance $D_2$ and the first distance $D_1$, $D_2$-$D_1$, may correspond to the oblique side and the height side of the right-angled triangle 420 including the distorted angle θ, respectively. Thus, the value obtained by dividing the difference between the second distance $D_2$ and the first distance $D_1$, $D_2$-$D_1$, by the real width $W_2$ may be expressed with the sine for the distorted angle θ, and the above-mentioned Equation 4 may be obtained by using the inverse sine for such a relationship.

When the distorted angle is calculated as described above, the second determining unit determines whether the distorted angle calculated in step S330 is equal to or larger than the preset critical angle (S341).

The radar may have a limitation in that it may not detect one corner of an object having one or more distorted angles, and the camera may have a limitation in that it may not recognize another object having one or more distorted angles at a predetermined distance. Thus, the critical angle is related to a distorted angle at which the above-described limitation exists, and may be calculated using test data.

When it is determined that the distorted angle is equal to or larger than the critical angle in step S341 (YES), the second determining unit calculates a TTC based on the smaller one of the first and second distances sensed in step S320 (S343).

This may be similar to the case in which the TTC is calculated using Equation 2 in step S311. However, unlike the case in which the TTC is calculated using the distance to the forward object in step S311, in step S343, the smaller one of the first and second distances is used.

Thereafter, the second determining unit determines whether the TTC calculated in step S343 is equal to or smaller than a preset second critical TTC (S345).

The second critical TTC is a time that may be calculated based on the distance of the sensing region of the second sensing unit, and may be calculated based on test data. In addition, the second critical TTC may be smaller than the first critical TTC used in step S313.

The second determining unit may correctly determine the risk of collision with the forward object by performing step S340 including steps 341 to 345. When the risk of collision exists, it may mean a situation in which the calculated TTC is equal to or less than the second critical TTC.

When it is determined that the TTC is equal to or less than the second critical TTC in step S345 (YES), the control unit may control at least one of the notification device, the braking device, and the steering device included in the own vehicle.

In an example, the control unit may control the notification device to provide a notification so as to draw the attention of a driver inside the vehicle or a pedestrian outside the vehicle.

In another example, the control unit may control the braking device in order to prevent the collision with a forward object. This may reduce the time required for the driver to recognize the situation and to input braking, and thus, the collision can be prevented.

In still another example, the control unit may control the steering device in order to avoid the collision with the forward object. As described above, the driving assistance apparatuses of the present embodiments may precisely sense a distance to a forward object having a distorted angle. In addition, it is possible to solve a problem in which the notification device, the braking device, and the steering device malfunction due to an erroneously sensed value.

Meanwhile, the second determining unit may further determine a direction corresponding to the smaller one of the first and second distances sensed by the second sensing unit as the moving direction of the forward object. For example, when the first distance, which is the distance to the left corner of the forward object, is smaller than the second distance, which is the distance to the right corner, the second determining unit may determine that the moving direction of the forward object is leftward.

Thus, the control unit may control at least one of the braking device and the steering device of the own vehicle such that the own vehicle moves in the direction opposite to the determined moving direction of the forward object. For example, when it is determined that the moving direction of the forward object is determined as leftward, the control unit may perform a control such that only the braking device installed in a right tire of the own vehicle is operated so as to cause the own vehicle to move rightward. Alternatively, the control unit may control the steering device of the own vehicle such that the own vehicle moves rightward.

Meanwhile, the calculating unit may further calculate an angular acceleration in order to avoid the collision with the forward object based on the calculated distorted angle. The angular acceleration may be inversely proportional to the distorted angle.

Thus, the control unit may calculate the side force $F_F$ of the front tires and the side force $F_R$ of the rear tires based on the calculated angular acceleration a, the inertial moment $I_Z$ of the own vehicle, the distance $L_F$ from the center of gravity of the own vehicle to the front tires, and the distance $L_R$ from the center of gravity to the rear tires, and using Equation 5 as follows. Here, the side force $F_F$ of the front tires and the side force $F_R$ of the rear tires may be set to have a specific proportional relationship in consideration of a stability, a performance, and so on.

$$I_Z * a = L_F * F_F - L_R * F_R \quad \text{Equation 5}$$

Further, the control unit may control the braking device installed in the front tires and the braking device installed in the rear tires depending on each of the calculated side forces $F_F$ and $F_R$ of the front tires and the rear tires.

Meanwhile, the first sensing unit may further sense whether a crossroad exists ahead. For example, when the number of sensed traffic lights or pedestrian crossings is equal to or larger than a preset critical number, the first sensing unit may sense that a crossroad exists ahead.

When it is sensed that a crossroad exists, the second determining unit may determine the risk of collision based on the determination as to whether the distorted angle is equal to or larger than the critical angle, the smaller one of the first and second distances, the speed of the forward object, and the speed of the own vehicle.

Hereinafter, a driving assistance method will be briefly described, which is an operation performed by the driving assistant apparatuses, which have been described with reference to FIGS. 2 to 5B.

Figure 6:
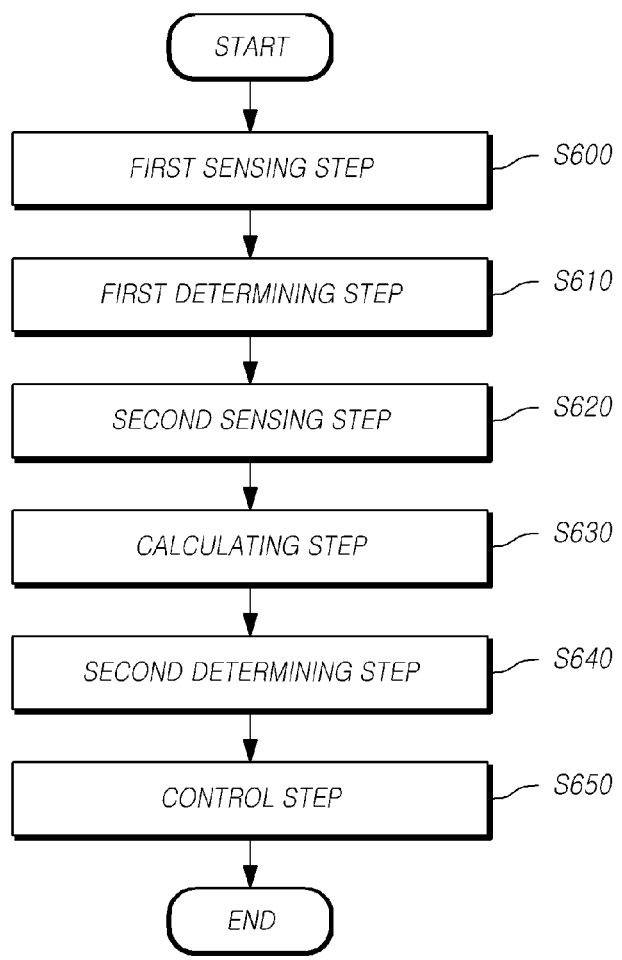
FIG. 6 is a view illustrating a flowchart of a driving assistance method according to one embodiment.

FIG. 6 is a view illustrating a flowchart of a driving assistance method according to one embodiment.

Referring to FIG. 6, a driving assistance method according to an embodiment may include: a first sensing step (S600) of sensing at least one of a width of a forward object, a distance to the forward object, a speed of the forward object, and a speed of the own vehicle; a first determining step (S610) of determining a risk of collision with the forward object based on the distance to the forward object, the speed of the forward object, and the speed of the own vehicle; a second sensing step (S620) of, when the first determining unit determines that there is a risk of collision, sensing a first distance, which is a distance to a first corner of the forward object, and a second distance, which is a distance to a second corner of the forward object; a calculating step (S630) of calculating a distorted angle of the forward object based on the first distance and the second distance; a second determining step (S640) of, when the calculated distorted angle is equal to or larger than a preset critical angle, further determining the risk of collision based on a smaller one of the first and second distances, the speed of the forward object, and the speed of the own vehicle; and a control step (S650) of, when the second determining unit determines that there is the risk of collision, control at least one of the notification device, the braking device, and the steering device.

In the first sensing step (S600), the width of the forward object, the distance to the forward object, and the speed of the forward object may be sensed using at least one of the radar and the camera, and the speed of the own vehicle may be sensed using a vehicle speed sensor. Without being limited thereto, however, in the first sensing step (S600), the width of the forward object, the distance to the forward object, the speed of the forward object, and the speed of the forward object may be sensed using another sensor.

The radar is a device that projects an electromagnetic wave and analyzes the electromagnetic wave when the electromagnetic wave is hit to, and reflected from, an object so as to sense the object. When the projected electromagnetic wave is a low frequency wave having a long wavelength, the electromagnetic wave is slightly attenuated, and thus, it is possible to detect a distant place, but the resolution may become worse since a precise measurement is impossible. On the contrary, when the projected electromagnetic wave is a high frequency wave, the high frequency wave may be easily absorbed into, or reflected from, water vapor contained in the air, snow, or rain to be greatly attenuated, and thus, it is impossible to detect a distance place, but a high resolution may be obtained.

On the contrary, the camera may include a light collecting unit configured to receive light, an imaging unit configured to form an image using the received light, and an adjusting device configured to adjust various states. The light collecting unit receives light so as to cause an image to be formed on the imaging unit. The imaging unit stores an image by using the image formed by the light collecting unit. A film camera uses a photosensitive film as the imaging unit, and a digital camera uses a Complementary Metal Oxide Semiconductor (CMOS) or a Charge Coupled Device (CCD), which converts a light signal into an electric signal, as the imaging unit. The adjusting device may include an iris configured to adjust a size of an aperture, a shutter configured to receive or block light, a flash for use in photographing in a dark place, a viewfinder configured to look in advance at an object to be photographed, a panorama function for continuous photographing, and so on.

The vehicle speed sensor may include a mechanical vehicle speed sensor configured to transmit the rotation of a transmission output shaft to a driving shaft of a speedometer via a flexible shaft, thereby moving an indicator, and an electronic vehicle speed sensor configured to detect the rotation of the transmission output shaft using an electronic pickup, a hall device, a reed switch, a magneto resistive element, and so on.

In the first determining step (S610), a relative speed is calculated based on the speed of the forward object, which is sensed by the first sensing unit (S600), and a Time To Collision (TTC) is calculated based on the calculated speed of the own vehicle and the distance to the forward object, which is sensed in the first sensing step (S600). When the calculated TTC is equal to or less than a preset first critical TTC, it may be determined that there is a risk of colliding with the forward object.

The relative speed may be calculated by subtracting the speed of the own vehicle from the speed of the forward object, and the TTC may be calculated by dividing the distance to the forward object by the relative speed.

The first critical TTC is a time that is set based on test data, and an error that may occur when the radar and the camera sense a forward vehicle having a distorted angle may be considered in the first critical TTC.

In the second sensing step (S620), a first distance, which is a distance to a first corner of the forward object, and a second distance, which is a distance to a second corner, may be sensed using an ultrasonic sensor.

The ultrasonic sensor refers to a sensor that uses a characteristic of an ultrasonic wave, which is a sound having a high frequency (about 20 kHz or more) that is inaudible to the human ear, and may be used for air, liquid, and solid mediums, and may measure speed, distance, concentration, viscosity, and so on. The ultrasonic sensor has a disadvantage in that the length of its sensing region is short as compared with a radar or a camera.

That is, in the second sensing step (S620), a first distance, which is a distance to a first corner of the forward object, and a second distance, which is a distance to a second corner, may be sensed using one or more ultrasonic sensors.

For example, the second sensing unit may determine a point where a distance sensed using an ultrasonic sensor decreases and then increases with respect to one direction and a point at which the distance linearly increases and then nonlinearly increases with respect to another direction, or a point at which the distance linearly increases and nonlinearly increases with respect to the one direction and a point at which the distance decreases and then increases with respect to the nother direction are determined as a first corner and a second corner, respectively, and the distances to the first corners and the second corners may be sensed as the first distance and the second distance, respectively.

This may result from the fact that, when a tetrahedron including a vehicle in a distorted state is sensed by the ultrasonic sensor, two planes are observed from one of two corners (corners, each of which is formed by two planes) at the ultrasonic sensor side, but only one plane is observed from the other corner.

In the calculating step (S630), the distorted angle of the forward object may be calculated based on the first and second distances sensed in the second sensing step S620.

For example, the distorted angle may be calculated based on the width of the forward object, which is sensed in the first sensing step (S600) and a difference between the first and second distances sensed in the second sensing step (S620), and using a trigonometric function. The virtual width of the forward object and the difference between the first and second distances in a case where the distorted state is not considered may have a tangent relationship with respect to the distorted angle, and the real width of the forward object and the difference between the first and second distances in a case where the distorted state is considered may have a sine relationship with respect to the distorted angle. By using these relationships, the distorted angle of the forward object may be calculated in the calculating step S630.

When the distorted angle calculated in the calculating step (S630) is equal to or larger than the preset critical angle in the second determining step (S640), in the second determining step (S620), the risk of collision may be further determined based on the small distance of the first and second distances sensed in the second sensing step (S620) and the speeds of the forward object and the own vehicle sensed by the first sensing step (S600).

For example, in the second determining step (S640), the relative speed is calculated by subtracting the speed of the own vehicle from the speed of the forward object, and a TTC is calculated by dividing the smaller one of the first and second distances by the relative speed. When the TTC is equal to or smaller than the preset first critical TTC, it may be determined that there is a risk of collision.

When the forward object has a distorted angle that is equal to or larger than the critical angle, an erroneous longitudinal length to the forward object may be sensed in first sensing step (S600). Accordingly, by using the distance sensed in the second sensing step (S620), the risk of collision may be correctly determined in step in the second determining step (S640).

According to the risk of collision determined in the second determining step (S640), at least one of the notification device, the braking device, and the steering device included in the own vehicle may be controlled in the control step (S650), thereby preventing the collision with the forward object.

Meanwhile, in the second determining step (S640), a direction corresponding to the smaller one of the first and second distances sensed in the second sensing step (S620) may be further determined as the moving direction of the forward object. For example, when the first distance, which is the distance to the left corner of the forward object, is smaller than the second distance, which is the distance to the right corner, it may be determined that the moving direction of the forward object is leftward in the second determining step (S640).

Thus, in the control step (S650), at least one of the braking device and the steering device of the own vehicle may be controlled such that the own vehicle moves in the direction opposite to the determined moving direction of the forward object. For example, when it is determined that the moving direction of the forward object is leftward, in the control step (S650), a control may be performed such that only the braking device installed in a right tire of the own vehicle is operated so as to cause the own vehicle to move rightward. Alternatively, in the control step (S650), the steering device of the own vehicle may be controlled such that the own vehicle moves rightward.

Meanwhile, in the calculating step (S630), an angular acceleration may be further calculated in order to avoid the collision with the forward object based on the calculated distorted angle. The angular acceleration may be inversely proportional to the calculated distorted angle.

Thus, in the control step (S650), a side force of the front tires and a side force of the rear tires may be calculated based on the calculated angular acceleration, the inertia moment of the own vehicle, the distance from the center of gravity of the own vehicle to the front tires, and the distance from the center of gravity to the rear tires, and the braking devices installed in the front tires or the braking devices installed in the rear tires may be controlled depending on each of the side force of the front tires and the side force of the rear tires.

Meanwhile, in the first sensing step (S600), it may be further sensed whether a crossroad exists ahead. For example, when the number of sensed traffic lights or pedestrian crossings is equal to or larger than a preset critical number, in the first sensing step (S600), it may be sensed that a crossroad exists ahead.

When it is sensed that a crossroad exists, in the second determining step (S640), the risk of collision may be determined based on the determination as to whether the distorted angle is equal to or larger than the critical angle, the smaller one of the first and second distances, the speed of the forward object, and the speed of the own vehicle.

In addition, the driving assistant method of the present embodiment may conduct all the operations that are conducted by the driving assistance apparatuses described above with reference to FIGS. 2 to 5B.

The above description and the accompanying drawings provide an example of the technical idea of the present invention for illustrative purposes only. Those having ordinary knowledge in the technical field, to which the present invention pertains, will appreciate that various modifications and changes in form, such as combination, separation, substitution, and change of a configuration, are possible without departing from the essential features of the present invention. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A driving assistance apparatus comprising:
    a first sensing unit configured to sense a width of a forward object, a distance to the forward object, a speed of the forward object, and a speed of an own vehicle;
    a first determining unit configured to determine a risk of collision with the forward object based on the distance to the forward object, the speed of the forward object, and the speed of the own vehicle;
    a second sensing unit configured to, when the first determining unit determines that there is a risk of collision, sense a first distance, which is a distance to a first corner of the forward object, and a second distance, which is a distance to a second corner of the forward object;
    a calculating unit configured to calculate a distorted angle of the forward object based on the width of the forward object, the first distance, and the second distance;
    a second determining unit configured to, when the calculated distorted angle is equal to or larger than a preset critical angle, further determine the risk of collision based on a smaller one of the sensed first and second distances, the speed of the forward object, and the speed of the own vehicle; and a control unit configured to, when the second determining unit determines that there is the risk of collision, control at least one of the notification device, the braking device, and the steering device.

2. The driving assistance apparatus of claim 1, wherein the first sensing unit senses the width of the forward object, the distance to the forward object, and the speed of the forward object using at least one of the radar and the camera, and the second sensing unit senses the first distance and the second distance using an ultrasonic sensor.

3. The driving assistance apparatus of claim 1, wherein the first determining unit calculates a relative speed based on the speed of the forward object and the speed of the own vehicle and calculates a time to collision based on the distance to the forward object and the relative speed, and when the time to collision is equal to or smaller than a preset first critical time to collision, the first determining unit determines that there is the risk of collision with the forward object.

4. The driving assistance apparatus of claim 1, wherein the second determining unit calculates a relative speed based on the speed of the forward object and the speed of the own vehicle and calculates a time to collision based on a smaller one of the first distance and the second distance, and when the time to collision is equal to or smaller than a preset second critical time to collision, the second determining unit determines that there is the risk of collision with the forward object.

5. The driving assistance apparatus of claim 1, wherein a first critical time to collision, which is a standard for determining the risk of collision by the first determining unit, is longer than a second critical time to collision, which is a standard for determining the risk of collision by the second determining unit.

6. The driving assistance apparatus of claim 1, wherein the calculating unit calculates the distorted angle θ based on the width of the forward object, the first distance D1, and the second distance D2, and using a trigonometric function.

7. The driving assistance apparatus of claim 6, wherein the width of the forward object is a virtual width $W_1$ in which a distorted state is not considered, rather than a real width of the forward object in which the distorted state is considered, and the distorted angle θ is as follows:

$$\theta = \tan^{-1}((D_1 - D_2)/W_1).$$

8. The driving assistance apparatus of claim 6, wherein the width of the forward object is a real width $W_2$ of the forward object in which the distorted state is considered, and the distorted angle θ is as follows:

$$\theta = \sin^{-1}((D_1 - D_2)/W_2).$$

9. The driving assistance apparatus of claim 1, wherein the second determining unit further determines a direction corresponding to the smaller one of the first and second distances as a moving direction of the forward object, and wherein the control unit controls at least one of the braking device and the steering device such that the vehicle moves in a direction opposite to the moving direction of the forward object.

10. The driving assistance apparatus of claim 1, wherein the calculating unit further calculates an angular acceleration a for avoiding the collision with the forward object based on the distorted angle, and wherein the control unit controls the braking device depending on a side force $F_F$ of front tires and a side force $F_R$ of rear tires which are calculated based on the angular acceleration, a preset inertia moment $I_z$ of the own vehicle, a distance $L_F$ from a center of gravity of the own vehicle to the front tires and a distance $L_R$ from the center of gravity to the rear tires.

11. The driving assistance apparatus of claim 1, wherein the first sensing unit further senses whether a crossroad exists ahead, and, when it is sensed that the crossroad exists, the second determining unit determines whether the distorted angle is equal to or larger than the preset critical angle.

12. The driving assistance apparatus of claim 11, wherein the first sensing unit senses that the crossroad exists when a number of sensed traffic lights or pedestrian crossings is equal to or larger than a preset critical number.

13. A driving assistance method comprising:
a first sensing step of sensing a width of a forward object, a distance to the forward object, a speed of the forward object, and a speed of an own vehicle;
a first determining step of determining a risk of collision with the forward object based on the distance to the forward object, the speed of the forward object, and the speed of the own vehicle;
a second sensing step of, when the first determining unit determines that there is a risk of collision, sensing a first distance, which is a distance to a first corner of the forward object, and a second distance, which is a distance to a second corner of the forward object;
a calculating step of calculating a distorted angle of the forward object based on the first distance and the second distance;
a second determining step of, when the calculated distorted angle is equal to or larger than a preset critical angle, further determining the risk of collision based on a smaller one of the sensed first and second distances, the speed of the forward object, and the speed of the own vehicle; and
a control step of, when the second determining unit determines that there is the risk of collision, controlling at least one of the notification device, the braking device, and the steering device.

14. The driving assistance method of claim 13, wherein, in the first determining step, a relative speed is calculated based on the speed of the forward object and the speed of the own vehicle and a time to collision is calculated based on the distance to the forward object and the relative speed, and when the time to collision is equal to or smaller than a preset first critical time to collision, it is determined that there is the risk of collision with the forward object.

15. The driving assistance method of claim 13, wherein, in the first determining step, a relative speed is calculated based on the speed of the forward object and the speed of the own vehicle and a time to collision is calculated based on a smaller one of the first distance and the second distance and the relative speed, and when the time to collision is equal to or smaller than a preset first critical time to collision, it is determined that there is the risk of collision with the forward object.

* * * * *